United States Patent
Opitz et al.

(10) Patent No.: US 9,460,035 B2
(45) Date of Patent: Oct. 4, 2016

(54) METHOD FOR OPERATING A SLAVE NODE OF A DIGITAL BUS SYSTEM

(71) Applicant: GE Energy Power Conversion GmbH, Berlin (DE)

(72) Inventors: Thorsten Opitz, Berlin (DE); Frank Wothe, Berlin (DE)

(73) Assignee: GE ENERGY POWER CONVERSION TECHNOLOGY LIMITED, Warwickshire (GB)

(*) Notice: Subject to any disclaimer, the term of this patent is extended or adjusted under 35 U.S.C. 154(b) by 262 days.

(21) Appl. No.: 14/264,086

(22) Filed: Apr. 29, 2014

(65) Prior Publication Data

US 2014/0325102 A1   Oct. 30, 2014

(30) Foreign Application Priority Data

Apr. 29, 2013 (DE) .................. 10 2013 207 826

(51) Int. Cl.
  *H04J 3/24* (2006.01)
  *G06F 13/362* (2006.01)
  *H04L 1/00* (2006.01)
  (Continued)

(52) U.S. Cl.
  CPC ......... *G06F 13/362* (2013.01); *G06F 13/4256* (2013.01); *H04L 1/0083* (2013.01); *H04L 12/403* (2013.01); *H04L 12/40032* (2013.01); *H04L 2012/40221* (2013.01); *H04L 2212/00* (2013.01)

(58) Field of Classification Search
  CPC .......................... H04L 1/0083; H04L 2212/00
  USPC ....................................................... 370/474
  See application file for complete search history.

(56) References Cited

U.S. PATENT DOCUMENTS

| 7,668,994 | B2 | 2/2010 | Albrecht et al. |
| 7,953,115 | B2* | 5/2011 | Nataga ................. H04W 28/06 370/465 |
| 2005/0114577 | A1 | 5/2005 | Beckhoff et al. |

FOREIGN PATENT DOCUMENTS

| AT | 412315 B | 5/2004 |
| DE | 102008016907 | 8/2009 |

(Continued)

OTHER PUBLICATIONS

German office action dated Apr. 4, 2014 which was issued in connection with German Patent Application No. 102013207826.9 which was filed on Apr. 29, 2013.

(Continued)

*Primary Examiner* — Ernest Unelus
(74) *Attorney, Agent, or Firm* — GE Global Patent Operation; Catherine J. Toppin

(57) ABSTRACT

A method for operating a slave node of a digital bus system is described. The slave node comprises two sending and receiving devices. In the bus system, an input data frame is sent to a master node in input direction. The slave node receives the input data frame by the first sending and receiving device. The slave node stores service data packets contained in the input data frame in a FIFO memory. The slave node attaches at least one process data packet of its own to a last process data packet in the input data frame. The slave node attaches the service data packets to the process data packet, which is now last, in the input data frame. The slave node sends the input data frame, which was changed in this manner, to the next node in input direction by the second sending and receiving device.

12 Claims, 3 Drawing Sheets

(51) Int. Cl.
  *G06F 13/42* (2006.01)
  *H04L 12/40* (2006.01)
  *H04L 12/403* (2006.01)

(56) References Cited

FOREIGN PATENT DOCUMENTS

| DE | 102009001081 B3 | 4/2010 |
| EP | 1223710 A2 | 7/2002 |
| EP | 1748338 A1 | 1/2007 |
| EP | 2093941 A1 | 8/2009 |
| WO | 03054644 A2 | 7/2003 |
| WO | 03061211 | 7/2003 |
| WO | 2009021974 A2 | 2/2009 |

OTHER PUBLICATIONS

EP Search Report issued in connection with corresponding EP Patent Application No. 14165695.9 dated on Aug. 13, 2014.

\* cited by examiner

METHOD FOR OPERATING A SLAVE NODE OF A DIGITAL BUS SYSTEM

BACKGROUND TO THE INVENTION

Embodiments of the present invention relate to a method for operating a slave node of a digital bus system.

A plurality of industrial digital bus systems and corresponding standards exists. Examples for this are PROFI BUS and Ethercat. PROFI BUS is a registered trademark of Phoenix Contact GmbH & Co. KG. Ethercat is a registered trademark of Hans Beckhoff.

WO 2009/021974 A2 discloses an Ethercat system for communication between master and slave systems. A communication cycle of the master comprises two data frames. The first data frame is suitable for retrieving data and the second data frame is suitable for sending data.

EP 1 223 710 A2 discloses a system for controlling actuators. The system comprises a bidirectional data bus between nodes, which are connected to the data bus. One node comprises two interfaces, wherein data, which are to be transmitted, are sent through both interfaces.

WO 03/054644 A2 discloses a method for transmitting data to a serial bus between at least one active bus subscriber and at least one passive bus subscriber.

For switching high-power semiconductor switching elements, which are connected to one another via an industrial bus system, a high synchronization of the individual bus subscribers and a high evaluation speed of the assigned sensor system must be ensured. A nearly simultaneous or highly synchronized switching, respectively, of the high-power semiconductor switching elements can only be ensured in this way and the high currents, which are to be switched, do not lead to the destruction of the system.

It is the task of the embodiments of the present invention to provide a method for operating a slave node, which improves and speeds up the distribution of information.

SUMMARY

The task is solved by means of a method for operating a slave node of a digital bus system.

In the case of the claimed method, the slave node stores service data packets, which are contained in an input data frame, in a FIFO memory. The slave node subsequently attaches at least one process data packet of its own, which is to be sent, to a last process data packet in the input frame. The slave node subsequently attaches the service data packets, which are stored in the FIFO memory, to the process data packet, which is now last. The input data frame, which was changed in this manner, is now sent to a master node in input direction.

In an embodiment, the input data frame is utilized optimally through this and the master node receives the process data packets, which display the status of actuators, in particular high-power semiconductor switching elements, in presorted order. On the one hand, the input data frame, which passes through a plurality of slave nodes, is thus set up such that the process data packets are arranged in the front part of the input data frame. On the other hand, the position of the slave nodes in the bus system is considered. For example, the data packets of the slave node, which is furthest from the master node, are thus in first position, whereby the time, which the information requires to get through the bus system to the master node, is considered. After evaluating this information, a switching command can thus be sent immediately to the slave node or emergency measures, such as shut-off, can be initiated immediately when a malfunction has been determined.

In an embodiment, there is provided a slave node for a digital bus system. The slave node comprises a first sending and receiving device; and a second sending and receiving device, wherein the slave node is configured to send an input data frame to a master node in the digital bus system in an input direction, receive the input data frame by the first sending and receiving device, store service data packets contained in the input data frame in a FIFO memory, attach at least one process data packet of the slave node to a last process data packet in the input data frame, attach the service data packets stored in the FIFO memory to the last process data packet in the input data frame, and send the input data frame comprising the last process data packet to a next node in the input direction by the second sending and receiving device.

In an embodiment, there is provided a digital bus system for operating high-power semiconductor switching elements. The digital bus system comprises a master node, at least one slave node comprising a first sending and receiving device and a second sending and receiving device, and a last slave node arranged at an end opposite of the master node, wherein the at least one slave node is configured to send an input data frame to the master node in an input direction, receive the input data frame by the first sending and receiving device, store service data packets contained in the input data frame in a FIFO memory, attach at least one process data packet of the slave node to a last process data packet in the input data frame, attach the service data packets stored in the FIFO memory to the last process data packet in the input data frame, and send the input data frame comprising the last process data packet to a next node in the input direction by the second sending and receiving device.

BRIEF DESCRIPTION OF THE DRAWINGS

Further features, potential applications and advantages of the invention follow from the below description of exemplary embodiments of the invention, which are explained by means of the drawing.

DETAILED DESCRIPTION

Figure 1:
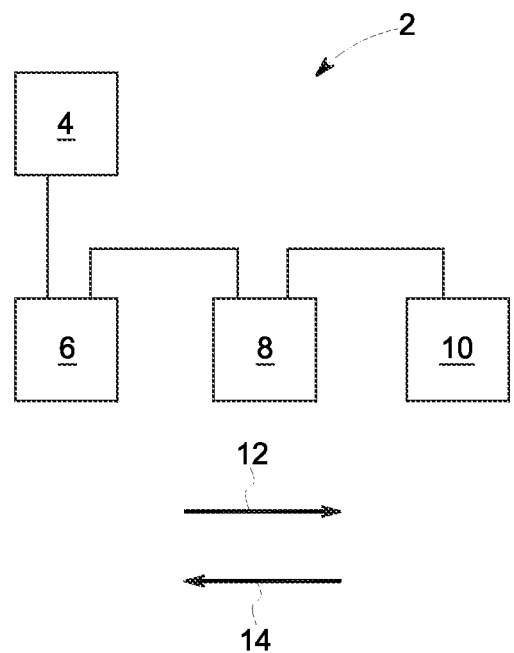
FIG. 1 shows a schematically illustrated industrial bus system.

FIG. 1 shows a schematically illustrated setup of an industrial bus system 2, which comprises a master node 4 as well as a plurality of slave nodes 6, 8 and 10. The slave nodes 6, 8 and 10 are connected to one another in series via corresponding data lines. The master node 4 is arranged at one end of the slave nodes 6 and 10, which are connected to one another in series, wherein the master node is also connected to the slave node 6 via a corresponding data line.

Originating at the master node 4, an output data frame is sent in output direction 12 to the last slave node 10, which is located opposite the master node 4. Originating at the master node 4, the output data frame is initially sent to the slave node 6 for this purpose. The slave node 6 sends the received output data frame to the slave node 8. The slave node 8 sends the received output data frame to the slave node 10.

Originating at the last slave node 10, which is arranged at the opposite end of the master node 4, an input data frame 5 is sent to the master node 4 in input direction 14 as answer to the output data frame.

As is not shown in FIG. 1, the master node 4 can have a redundant design. For this purpose, a further master node is connected to the last slave node 10, wherein the further master node takes over the function of the last slave node and thus monitors the network traffic. If a breakdown of the master node 4 is identified, the further master node takes over the function thereof.

The master node defines a time period between the receipt of the output data frame and the sending of the input data frame for the last slave node 10.

By sending the output data frame, the master node 4 thus defines the communication via the industrial bus system 2. The sending of output data frames through the master node 4 can take place within a fixed or variable cycle time. The first slave node 6, which is arranged adjacent to the master node 4, provides its time signal to the other nodes 4, 8 and 10. To initialize the bus system 2, the run times between the adjacent slave nodes 6 and 8 as well as 8 and 10 are determined, whereby a synchronization of the clocks is attained in the slave nodes 6 to 10.

The slave nodes 6, 8, 10 are, in some embodiments, designed in hardware or FPGA technology (FPGA stands for Field Programmable Gate Array). In contrast, the master node 4 is, in some embodiments, designed as industry-pe comprising a real-time operating system.

Figure 2:
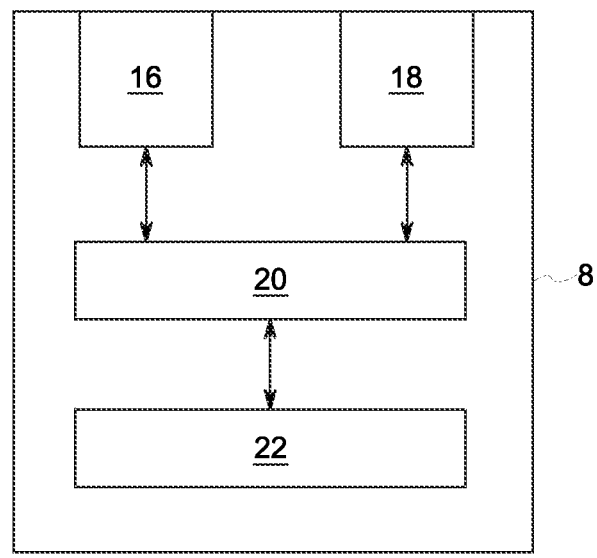
FIG. 2 shows a schematic setup of a slave node.

FIG. 2 shows the schematic setup of the slave node 8. The slave nodes 6 and 10 are set up identically. The slave node 8 comprises a first and a second sending and receiving device 16 and 18. The two sending and receiving devices are in each case designed as Gigabit-Ethernet interface, in particular according to the standards IEEE 802.3z or IEEE 802.3ab. A communication block 20 takes over the coordination between the two sending and receiving devices 16 and 18. Actuators, such as high-power semiconductor switching elements, as well as sensors, which are assigned to the actuators, are assigned in the application block 22 in a manner, which is not shown.

In the case of the last slave node 10, without the redundant master node, only one of the sending and receiving devices 16 and 18 is connected to a further node, for example to the slave node 8. The last slave node 10 recognizes that one of the sending and receiving devices 16 or 18 is open and is not connected to a further node, and thus takes over the aforementioned functions of the last slave node 10.

In particular, a high-power semiconductor switching element is assigned to the slave node 8 for switching sensors, wherein the high-power semiconductor switching element is switched as a function of output data, which are transmitted via the output data frame, and wherein the input data, which are created by the sensors, are sent to the master node 4 by means of the input data frame.

Figure 3:
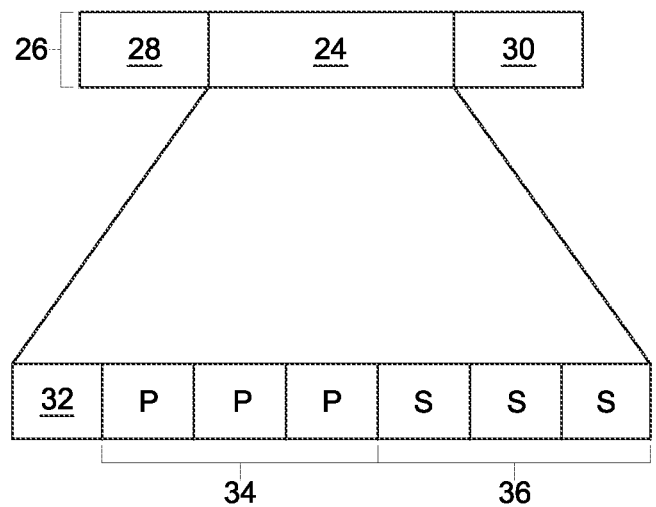
FIG. 3 shows the schematic setup of an input data frame or output data frame.

FIG. 3 shows the setup of a data frame 24 in a schematic manner, wherein the data frame 24 represents input data frame as well as output data frame. The afore-mentioned Gigabit-Ethernet technology is used to send the data frame 24. This is why the data frame 24 is arranged in the payload of a Gigabit-Ethernet data frame 26. The Gigabit-Ethernet data frame 26 includes a head part 28, which is arranged upstream of the data frame 24, as well as a test part 30, which is arranged downstream from the data frame 24.

A broadcast address is always specified as MAC address in the head part 28 of the Gigabit-Ethernet data frame 26, because the network traffic can thus be observed in a simple manner, when a so-called packet sniffer is arranged between two network nodes. Prior to sending, the test part 30 is always calculated anew by a node. The Gigabit-Ethernet data frame 26 corresponds to the standard IEEE 802.3.

Figure 4:
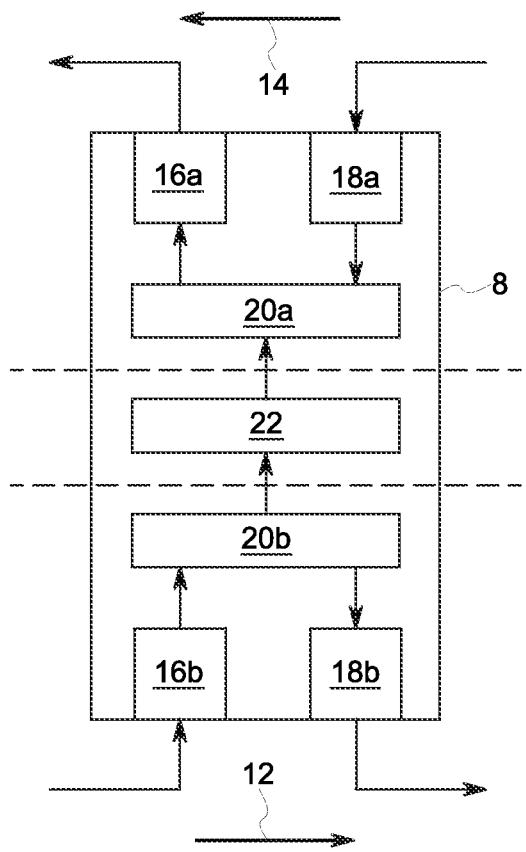
FIG. 4 shows a detailed setup of a slave node in a schematic manner.

The data frame 24 consists of a head part 32 as well as of process data packets P, which connect to the head part 32, and of service data packets S, which connect to the process data packets. The service data packets S are optional. The head part 32, which in particular includes the clock time of the first slave node 6, is thus followed by a first section 34 of process data packets and by an optional second section 36 of service data packets S. The process data packets P serve to operate the actuators and to evaluate the sensors. The service data packets S serve to configure and update the bus system 2 and the nodes thereof FIG. 4 shows a detailed setup of the slave node 8 in a schematic manner. Contrary to FIG. 2, the communication block 20, originating at the application block 22, is divided into two parts 20a and 20b. Likewise, the first and the second sending and receiving device 16 and 18 are divided into the respective parts 16a, 16b and 18a and 18b.

In output direction 12, the receiving device 16b receives a Gigabit-Ethernet data frame 26 and leads at least the output data frame 24 to the communication block 20b. In output direction 12 away from the master node 4, the slave node 8 therefore receives an output data frame 24 by means of the sending and receiving device 16. The slave node 8 only has read accesses to the content of the output frame 24 and provides the content of the output data frame 24 to the application block 22. The output data frame 24 is sent through the slave node 8 to the next node in output direction 12 by means of the sending device 18b of the sending and receiving device 18.

The receiving device 18a of the sending and receiving device 18 receives a Gigabit-Ethernet data frame 26 and provides the content of the input data frame 24 to the communication block 20a, wherein the communication block 20a is allowed to access the frame 24. Data provided by the application block 22 are in particular inserted into the input data frame 24. The communication block 20a provides the input data frame 24, which was changed in this manner, to the sending device 16a of the sending and receiving device 16 for sending purposes, wherein the sending device 16a creates a new Gigabit-Ethernet data frame 26, the payload of which includes the changed input data frame 24. The input data frame 24 is sent through the slave node 8 to the next node in input direction 14 by means of the sending device 16a of the sending and receiving device 16.

As suggested by the dashed lines around the application block 22, the processing of the output data frame and of the input data frame in the transport-oriented layers of the slave node 8 is, in an embodiment, carried out parallel to one another and independent from one another. The elements above and below the application block 22 are part of the transport-oriented layers of the slave node 8.

Figure 5:
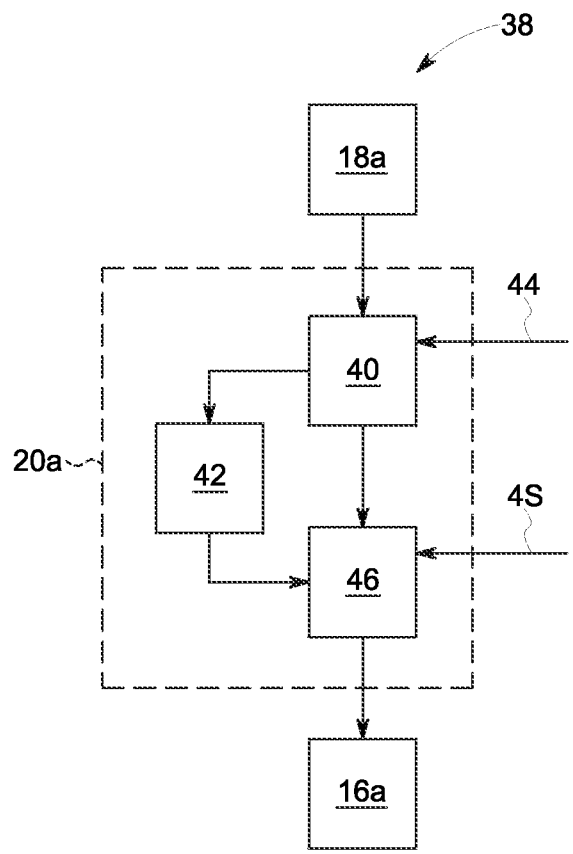
FIG. 5 shows a schematically illustrated flow chart.

FIG. 5 shows a schematically illustrated block diagram 38. The receiving device 18a provides the input data frame 24 to the communication block 20a. Service data packets S contained in the input data frame 24 are read in a block 40 in a first step and are stored in a FIFO memory 42. According to arrow 44, at least one further process data packet P is provided to the block 40. In a further step, the block 40 adds the process data packet P, which is provided according to arrow 44, to a last process data packet P in the input data frame 24. The slave node 8 thus attaches at least one process data packet P of its own, which is to be sent to a last process data packet P in the input data frame. However, if a process data packet P is not yet available in the received input data frame 24, the further process data packet P is the first process data packet in the input data frame 24, which is to be sent.

According to arrow 4S, the slave node 8 provides a service data packet S, which is to be sent, to the block 46. The block 46 adds the service data packet S, which is provided by the slave node 8, to the service data packets S from the FIFO memory 42, which are already in the input data frame 24, which is to be sent. In the alternative, the service data packet S, which is provided according to arrow 4S, can also be supplied to the FIFO memory 42 after filling the FIFO memory 42 with the service data packets S from the received input data frame 24.

In a block 46, the service data packets S, which are stored in the FIFO memory 42, are attached to the process data packet P, which is now last. The input data frame 24 has now been changed such that all of the process data packets are located in a first part 34, as is shown in FIG. 3, and all of the service data packets are located in a second part 36, which follows the first part 34. The input data frame 24, which was changed in this manner, is sent to the next node in input direction 14 by means of the sending device 16a.

A maximum size can be determined for the content of the input data frame 24. According to block 40, the slave node 8 attaches its own process data packet, which is to be sent, to the last process data packet in the input data frame 24. According to the block 46, the slave node 8 attaches a first number of the service data packets S, which are stored in the FIFO memory 42, to the process data packet P, which is now last, such that the maximum size for the content of the input data frame is not exceeded. The slave node 8 sends the input data frame 24 to the next slave node 6 in input direction 14 by means of the sending device 16a. A second number of service data packets S, which remained in the FIFO memory 42, is sent in a next input data frame 24.

In the alternative or in addition, the master node 4 can ensure that the maximum size for the content of the input data frame 24 is not exceeded in that the master node 4 provides for a threshold value for the content of the input data frame 24 and so that the master node 4 only requests so many process data packets from the slave nodes 6, 8 by means of the output data frame 24 so that the threshold value for the content of the input data frame 24, which follows as answer to the sending of the output data frame 24 through the master node 4, is not exceeded.

Figure 6:
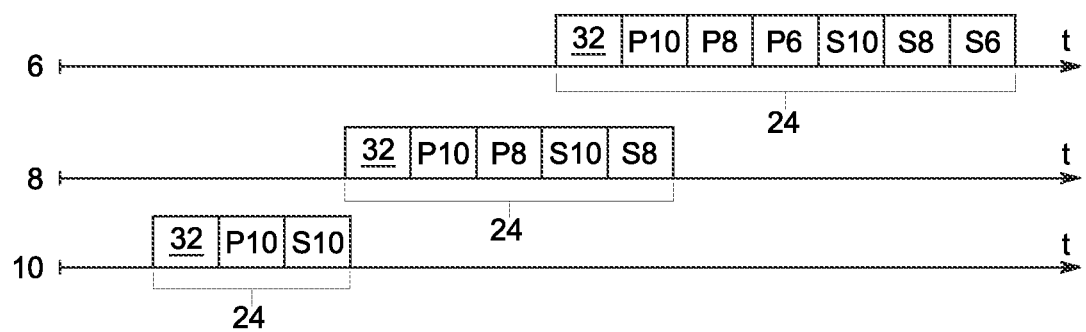
FIG. 6 shows a schematically illustrated communication process in an input direction towards a master node.

FIG. 6 shows the function of the communication block 20a in an exemplary and schematic manner. The slave node 10 thus sends the output data frame 24 within a Gigabit-Ethernet data frame 26 to the slave node 8. When receiving through the slave node 8, the output data frame 24 receives the head part 32 as well as a process data packet P10 and a service data packet S10.

The slave node 8 receives the input data frame 24 from the slave node 10. The slave node 8 must send a process data packet P8 and a service data packet S8. According to the communication block 20a from FIG. 5, the process data packet P8 is added downstream from the process data packet P10. The service data packet S10 is buffered in the FIFO memory 42 and is inserted in the block 46 downstream from the process data packet P8. The service data packet S8 is inserted downstream from the service data packet S10. The same method is carried out in the slave node 6, wherein the slave node 6 used the process data packet P6 and the service data packet S6.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for operating a slave node of a digital bus system, wherein the slave node is configured to operate a high-power semiconductor switching element, wherein the slave node comprises a first sending and receiving device and a second sending and receiving device, wherein an input data frame is sent to a master node in the bus system in an input direction, the method comprising:
   receiving the input data frame by the first sending and receiving device;
   storing service data packets contained in the input data frame in a FIFO memory;
   attaching at least one process data packet of the slave node to a last process data packet in the input data frame;
   attaching the service data packets stored in the FIFO memory to the last process data packet in the input data frame; and
   sending the input data frame comprising the last process data packet to a next node in the input direction by the second sending and receiving device.

2. The method according to claim 1, further comprising:
   determining a maximum size for content of the input data frame;
   attaching a first number of the service data packets stored in the FIFO memory to the last process data packet in the input data frame, such that the maximum size for the content of the input data frame is not exceeded;
   sending the input data frame to the next node in the input direction; and
   sending a second number of service data packets remained in the FIFO memory to a next input data frame.

3. The method according to claim 1, further comprising:
   receiving, in an output direction away from the master node, an output data frame by the second sending and receiving device, wherein the slave node only has read access to content of the output data frame;
   sending the output data frame by the first sending and receiving device; and
   processing the output data frame and the input data frame in transport-oriented layers of the slave node, wherein the transport-oriented layers are parallel to one another and independent from one another.

4. The method according to claim 3, wherein the input data frame and/or the output data frame comprises a head part, subsequent process data packets, and service data packets attached to the subsequent process data packets.

5. The method according to claim 4, wherein the subsequent process data packets are arranged in the input data frame such that, originating at the slave node located opposite to the master node, a process data packet is in a first position downstream from the head part and other process data packets of further slave nodes are subsequently arranged in the order of the slave nodes in the direction of the master node.

6. The method according to claim 1, wherein the input data frame comprises a head part, subsequent process data packets, and service data packets attached to the subsequent process data packets.

7. A slave node for a digital bus system, the slave node comprising:
   a first sending and receiving device; and
   a second sending and receiving device,
   wherein the slave node is configured to:
   send an input data frame to a master node in the digital bus system in an input direction;
   receive the input data frame by the first sending and receiving device;
   store service data packets contained in the input data frame in a FIFO memory;
   attach at least one process data packet of the slave node to a last process data packet in the input data frame;
   attach the service data packets stored in the FIFO memory to the last process data packet in the input data frame; and
   send the input data frame comprising the last process data packet to a next node in the input direction by the second sending and receiving device.

8. The slave node according to claim 7, wherein each of the first sending and receiving device and the second sending and receiving device comprises a Gigabit-Ethernet interface.

9. The slave node according to claim 7, wherein each of the first sending and receiving device and the second sending and receiving device comprises a Gigabit-Ethernet interface according to IEEE 802.3z or IEEE 802.3ab.

10. The slave node according to claim 7, wherein a high-power semiconductor switching element and a sensor are assigned to the slave node, wherein the high-power semiconductor switching element is switched as a function of output data transmitted by an output data frame, and wherein input data are created by the sensor and sent to the master node by the input data frame.

11. A digital bus system for operating high-power semiconductor switching elements, the digital bus system comprising:
   a master node;
   at least one slave node comprising a first sending and receiving device and a second sending and receiving device; and
   a last slave node arranged at an end opposite of the master node,
   wherein the at least one slave node is configured to:
   send an input data frame to the master node in an input direction;
   receive the input data frame by the first sending and receiving device;
   store service data packets contained in the input data frame in a FIFO memory;
   attach at least one process data packet of the slave node to a last process data packet in the input data frame;
   attach the service data packets stored in the FIFO memory to the last process data packet in the input data frame; and
   send the input data frame comprising the last process data packet to a next node in the input direction by the second sending and receiving device.

12. The digital bus system according to claim 11, wherein the at least one slave node and the last slave node are connected to one another in series, wherein the master node is arranged at an end of the slave nodes, wherein, originating at the master node, an output data frame is sent to the last slave node located the end opposite of the master node in an output direction, and wherein, originating at the last slave node, the input data frame is sent to the master node in the input direction as answer to the output data frame.

\* \* \* \* \*